US010545705B2

(12) United States Patent
Morita et al.

(10) Patent No.: US 10,545,705 B2
(45) Date of Patent: Jan. 28, 2020

(54) PRINT APPARATUS AND METHOD FOR CONTROLLING PRINT APPARATUS CONNECTED WITH MULTIPLE WIRELESS COMMUNICATION ADAPTERS

(71) Applicant: SEIKO EPSON CORPORATION, Tokyo (JP)

(72) Inventors: Tsubasa Morita, Shiojiri (JP); Yasuhiro Ikeyoshi, Yokohama (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/603,055

(22) Filed: May 23, 2017

(65) Prior Publication Data

US 2017/0344320 A1 Nov. 30, 2017

(30) Foreign Application Priority Data

May 24, 2016 (JP) .................................. 2016-103570

(51) Int. Cl.
*G06F 3/12* (2006.01)
(52) U.S. Cl.
CPC .......... *G06F 3/1236* (2013.01); *G06F 3/1221* (2013.01); *G06F 3/1292* (2013.01)
(58) Field of Classification Search
None
See application file for complete search history.

(56) References Cited

U.S. PATENT DOCUMENTS

| 2007/0058031 | A1* | 3/2007 | Aizawa | H04N 1/00204 |
| | | | | 348/14.01 |
| 2009/0075594 | A1* | 3/2009 | Shichino | H04L 12/2803 |
| | | | | 455/41.3 |
| 2010/0167651 | A1* | 7/2010 | Sakuda | H04W 76/36 |
| | | | | 455/41.2 |
| 2011/0002271 | A1 | 1/2011 | Ogata et al. | |
| 2014/0300915 | A1* | 10/2014 | Ishikura | G03G 15/5066 |
| | | | | 358/1.13 |
| 2014/0330971 | A1* | 11/2014 | Kurose | H04L 47/00 |
| | | | | 709/225 |

(Continued)

FOREIGN PATENT DOCUMENTS

CN 103958210 A 7/2014
JP 2001-060961 A 3/2001

(Continued)

*Primary Examiner* — Henok Shiferaw
(74) *Attorney, Agent, or Firm* — Foley & Lardner LLP (57) ABSTRACT

A print apparatus configured to connect a plurality of wireless LAN adapters, the print apparatus includes a print mechanism configured to print on a print medium; a plurality of USB ports to which the wireless LAN adapter configured to be connected; and a processor configured to acquire information related to a wireless communication function of the wireless LAN adapter from the plurality of connected wireless LAN adapters in a case where it is detected that the wireless LAN adapters is in a state of being connected to the plurality of USB ports and executes processing which sets one higher function wireless LAN adapter to be in a usable state and sets the other wireless LAN adapter to be in an unusable state by comparing the acquired information items of the plurality of wireless LAN adapters.

10 Claims, 4 Drawing Sheets

(56) References Cited

U.S. PATENT DOCUMENTS

2015/0250012 A1\* 9/2015 Shibata ................ H04W 76/14
　　　　　　　　　　　　　　　　　　　370/254
2017/0064116 A1　3/2017 Ishikura
2017/0302813 A1　10/2017 Ishikura

FOREIGN PATENT DOCUMENTS

| JP | 2009-163289 A | 7/2009 |
| JP | 2011-011462 A | 1/2011 |
| JP | 2012-171220 A | 9/2012 |
| JP | 2015-162858 A | 9/2015 |

\* cited by examiner

PRINT APPARATUS AND METHOD FOR CONTROLLING PRINT APPARATUS CONNECTED WITH MULTIPLE WIRELESS COMMUNICATION ADAPTERS

This application claims priority under 35 U.S.C. § 119 to Japanese Patent Application No. 2016-103570 filed on May 24, 2016, the entire disclosure of which is expressly incorporated by reference herein.

BACKGROUND

1. Technical Field

The present invention relates to a print apparatus and a method for controlling the print apparatus.

2. Related Art

In the related art, there is known a print apparatus (printer) on which a wireless communication adapter (wireless dongle) is mounted and which wirelessly communicates by the wireless communication adapter (see, for example, JP-A-2011-11462).

Here, in a case where a plurality of connectors to which a wireless communication adapter can be connected are provided in the print apparatus, a state where a plurality of wireless communication adapters are connected to the print apparatus can be obtained. In the related art, there is not disclosed a technology for preventing a problem caused by a plurality of wireless communication adapters being connected by performing corresponding processing, in a case where a plurality wireless communication adapters are connected to the print apparatus, as described above.

SUMMARY

An advantage of some aspects of the invention is to provide a print apparatus configured to include a plurality of connectors to which a wireless communication adapter configured to be able to be connected and configured to be able to execute processing corresponding to a possibility that a plurality of wireless communication adapters are connected.

According to an example of the invention, there is provided a print apparatus to which a plurality of wireless communication adapters configured to be able to be connected, the print apparatus including: a print mechanism configured to print on a print medium; a plurality of connectors to which the wireless communication adapter configured to be able to be connected; and a processor (a control unit) configured to be able to acquire information related to a wireless communication function of the wireless communication adapter from the plurality of connected wireless communication adapters in a case where it is detected that the wireless communication adapters are in a state of being connected to the plurality of connectors and executes processing which sets one wireless communication adapter to be in a usable state and sets the other wireless communication adapters to be in an unusable state based on a result of comparison of the acquired information items of the plurality of wireless communication adapters.

According to the configuration of the example of the invention, in a case where the plurality of wireless communication adapters are connected to the print apparatus, the print apparatus can be shifted to a state of being capable of communicating with an external apparatus by prioritizing a high function wireless communication adapter suitable for use in communication, after a problem which can be generated due to the fact that the plurality of wireless communication adapters are connected in a usable state is prevented. In other words, according to the configuration described above, the print apparatus can execute processing that suitably corresponds to the possibility that the plurality of wireless communication adapters are connected.

In addition, in the print apparatus according to the example of the invention, in a case where the wireless communication adapter is set to be in an unusable state, the processor may stop the supply of electric power to the wireless communication adapter.

According to the configuration of the example of the invention, unnecessary power consumption can be suppressed and power saving can be realized.

In addition, in the print apparatus according to the example of the invention, in a case where the wireless communication adapter is set to be in an unusable state, the processor may stop allocation of a resource to the wireless communication adapter.

According to the configuration of the invention, unnecessary use of a resource can be suppressed.

In addition, in the print apparatus according to the example of the invention, the processor may execute the processing at the time of start.

According to the configuration of the example of the invention, occurring of a problem caused by a plurality of wireless communication adapters being connected can be prevented at the time of start.

In addition, in the print apparatus according to the example of the invention, in a case where the processor detects that the wireless communication adapters are in a state of being respectively connected to the plurality of connectors, when the processor detects that the wireless communication adapter is in a state of being connected to one connector and the wireless communication adapter is also connected to the other connector, the processor may set all the wireless communication adapters to be in an unusable state and cause to print information for urging restart on the print mechanism.

According to the configuration of the example of the invention, in a case where a wireless communication adapter is newly connected to the print apparatus while the print apparatus is started, the print apparatus can be smoothly shifted to a state of being capable of communicating with an external apparatus via the wireless communication adapter by suitable using that processing is executed at the time of start (restart), after a problem which can be generated when the plurality of wireless communication adapters are connected to the print apparatus in a usable state is reliably prevented.

In addition, in the print apparatus according to the example of the invention, in a case where the processor detects that the wireless communication adapters are in a state of being respectively connected to the plurality of connectors, when the processor detects that the wireless communication adapter is in a state of being connected to one connector and the wireless communication adapter is also connected to the other connector, the processor may execute the processing.

According to the configuration of the example of the invention, in a case where a wireless communication adapter is newly connected to the print apparatus while the print apparatus is started, the print apparatus can be smoothly shifted to a state of being capable of automatically communicating with an external apparatus via the wireless communication adapter without involving work of the user, after a problem which can be generated when the plurality of wireless communication adapters are connected to the print apparatus in a usable state is reliably prevented.

In addition, in the print apparatus according to the example of the invention, the information may relate to a frequency band corresponding to the wireless communication adapter, and the processor may determine the wireless communication adapter having a large number of corresponding frequency bands as the wireless communication adapter to use among the plurality of connected wireless communication adapters, in the processing.

According to the configuration of the example of the invention, as the print apparatus has a large number of corresponding frequency bands, has a large number of frequency bands which is selectable by the user, and has a high possibility of being capable of setting to the frequency according to environment in which the print apparatus is installed, the print apparatus can be preferentially a wireless communication adapter actually used for communication.

In addition, in the print apparatus according to the example of the invention, the information may relate to an electric wave reaching distance or an electric wave intensity of the wireless communication adapter, and the processor may perform determination by reflecting the electric wave reaching distance or the electric wave intensity of the wireless communication adapter when the wireless communication adapter to use is determined among the plurality of connected wireless communication adapters, in the processing.

According to the configuration of the example of the invention, the processor can suitably determine a high function wireless communication adapter to be used for communication preferentially, based on the electric wave reaching distance or the electric wave intensity.

According to another example of the invention, there is provided a method for controlling a print apparatus configured to include a print mechanism configured to print on a print medium; and a plurality of connectors to which a wireless communication adapter configured to be able to be connected, the method including: acquiring information relating to a wireless communication function of the wireless communication adapter from the plurality of connected wireless communication adapters in a case where the wireless communication adapters are connected to the plurality of connectors; and executing processing which sets one wireless communication adapter to be in a usable state and the other wireless communication adapter to be in an unusable state based on a result of comparison of the acquired information items of the plurality of wireless communication adapters.

According to the configuration of the example of the invention, in a case where the plurality of wireless communication adapters are connected to the print apparatus, the print apparatus can be shifted to a state of being capable of communicating with an external apparatus by prioritizing a high function wireless communication adapter suitable for use in communication, after a problem which can be generated due to the fact that the plurality of wireless communication adapters are connected in a usable state is prevented. In other words, according to the configuration described above, the print apparatus can execute processing that suitably corresponds to the possibility that the plurality of wireless communication adapters are connected.

BRIEF DESCRIPTION OF THE DRAWINGS

One aspect of the invention will be described with reference to the accompanying drawings, wherein like numbers reference like elements.

DESCRIPTION OF EXEMPLARY EMBODIMENTS

Hereinafter, at least one of the embodiments of the invention will be described with reference to the drawings.

Figure 1:
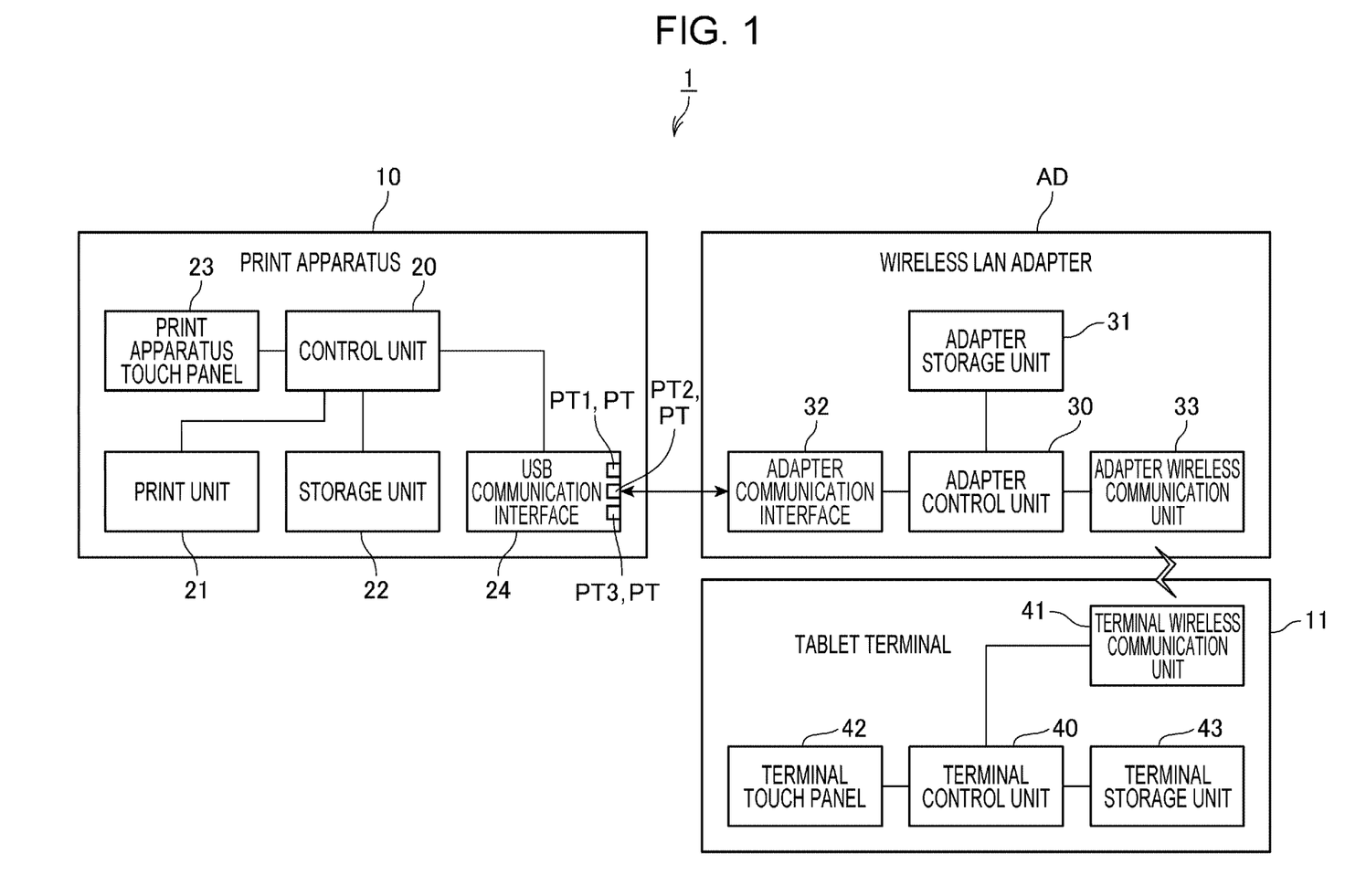
FIG. 1 is a block diagram illustrating a functional configuration of each device of the print system according to an embodiment.

FIG. 1 is a block diagram illustrating a functional configuration of each device of the print system 1 according to the present embodiment.

As illustrated in FIG. 1, the print system 1 includes a print apparatus 10 and a tablet terminal 11 functioning as a host computer for the print apparatus 10.

The print system 1 is a system in which the print apparatus 10 executes printing under the control of the tablet terminal 11. The print system 1 is provided at a checkout counter of a retail shop such as a supermarket or a convenience store or a store such as a restaurant such as a pub or a coffee shop, and issues a receipt according to accounting at the checkout counter.

The print apparatus 10 is an apparatus including a function of accommodating a print medium and printing on a print medium.

As illustrated in FIG. 1, the print apparatus 10 includes a control unit 20, a print unit 21, a storage unit 22, a print apparatus touch panel 23, and an USB communication interface 24.

The control unit 20 includes at least one CPU (at least one processor), at least one ROM, at least one RAM, other peripheral circuits, and the like, and controls the print apparatus 10. The control unit 20 controls each unit of the print apparatus 10 by cooperation of hardware and software such as reading and execution of the program stored in the ROM by the CPU and signal processing by a control circuit.

The print unit 21 includes mechanisms relating to printing on a print medium, such as a transport mechanism for transporting a print medium accommodated in the print apparatus 10 and a print mechanism for printing an image on a print medium by a printhead. The print unit 21 operates various mechanisms and prints an image on a print medium under the control of the control unit 20.

The storage unit 22 includes a nonvolatile memory and stores various kinds of information.

The print apparatus touch panel 23 is a touch panel provided in a casing of the print apparatus 10. The print apparatus touch panel 23 includes a display panel such as a liquid crystal display panel and a touch sensor provided to overlap the display panel. The display panel displays various images under the control of the control unit 20. The touch sensor detects touch operations and outputs the detected touch operations to the control unit 20. The control unit 20 executes processing corresponding to the touch operation by a user based on input from the touch sensor.

The USB communication interface 24 includes an interface board including a configuration related to communication by an USB such as an USB controller which performs communication according to USB specifications. The USB communication interface 24 includes a plurality of (three in the present embodiment) USB port PT1 (connection unit, connector), USB port PT2 (connection unit, connector), and USB port PT3 (connection unit, connector). Hereinafter, in a case where USB port PT1, USB port PT2, and USB port PT3 are not distinguished from each other, they are expressed as "USB ports PT".

The USB communication interface 24 communicates with an USB device connected to USB ports PT under the control of the control unit 20.

A wireless LAN adapter AD (wireless communication adapter) can be connected to the USB communication interface 24 of the print apparatus 10 as an USB device.

The wireless LAN adapter AD is an external adapter including a function of wirelessly communicating according to a predetermined wireless communication standard (in present example, it is assumed that it is Wi-Fi (registered trademark)) corresponding to the wireless LAN.

As illustrated in FIG. 1, the wireless LAN adapter AD includes an adapter control unit 30, an adapter storage unit 31, an adapter communication interface 32, and an adapter wireless communication unit 33.

The adapter control unit 30 includes at least one CPU (at least one processor), at least one ROM, at least one RAM, other peripheral circuits, and the like, and controls the wireless LAN adapter AD. The adapter control unit 30 controls the wireless LAN adapter AD by hardware and software functions such as program execution by the CPU and signal processing by the control circuit.

The adapter storage unit 31 includes a nonvolatile memory and stores various kinds of information.

The adapter communication interface 32 includes an interface board having a configuration related to communication by an USB such as an USB connector and an USB controller which performs communication according to USB specifications. The adapter communication interface 32 performs communication according to USB specifications under the control of the adapter control unit 30. The wireless LAN adapter AD is connected to the print apparatus 10 by the USB connector of the adapter communication interface 32 of the wireless LAN adapter AD being connected to any of the USB ports PT of the USB communication interface 24 of the print apparatus 10.

The adapter wireless communication unit 33 includes an antenna, a modulation/demodulation unit which modulates transmission data or demodulates reception data, and a RF unit which transmits the transmission data after modulation as electric wave via the antenna or outputs the signal included in electric wave received via the antenna to the modulation/demodulation unit, and the like. Under the control of the adapter control unit 30, the adapter wireless communication unit 33 wirelessly communicates with an external apparatus (including the tablet terminal 11) according to a predetermined wireless communication standard corresponding to the wireless LAN.

The tablet terminal 11 is a terminal type (plate shape) of a tablet provided with a terminal touch panel 42 in which a touch panel is provided on a wide area of a front surface thereof.

As illustrated in FIG. 1, the tablet terminal 11 includes a terminal control unit 40, a terminal wireless communication unit 41, a terminal touch panel 42, and a terminal storage unit 43.

The terminal control unit 40 includes a CPU, a ROM, a RAM, other peripheral circuits, and the like, and controls the tablet terminal 11. The terminal control unit 40 controls the tablet terminal 11 by hardware and software functions such as program execution by the CPU and signal processing by a signal processing circuit.

The terminal wireless communication unit 41 wirelessly communicates with an external apparatus (including wireless LAN adapter AD) according to a predetermined wireless communication standard under the control of the terminal control unit 40.

The terminal touch panel 42 includes a display panel such as a liquid crystal display panel and a touch sensor provided to overlap the display panel. The display panel displays various images under the control of the terminal control unit 40. The touch sensor detects a touch operation and outputs detected touch operation to the terminal control unit 40. The terminal control unit 40 executes processing corresponding to the touch operation by the user based on the input from the touch sensor.

The terminal storage unit 43 includes a memory and stores various kinds of information.

As described above, the print apparatus 10 includes a plurality of USB ports PT (a plurality of connection units, a plurality of connectors). Therefore, in the print apparatus 10, there is a possibility that a plurality of wireless LAN adapters AD are in a state of being connected to the wireless LAN adapter AD being connected to each of the plurality of USB ports PT.

The print apparatus 10 according to the present embodiment executes the following processing, based on a possibility that the plurality of wireless LAN adapters AD are connected.

Figure 2:
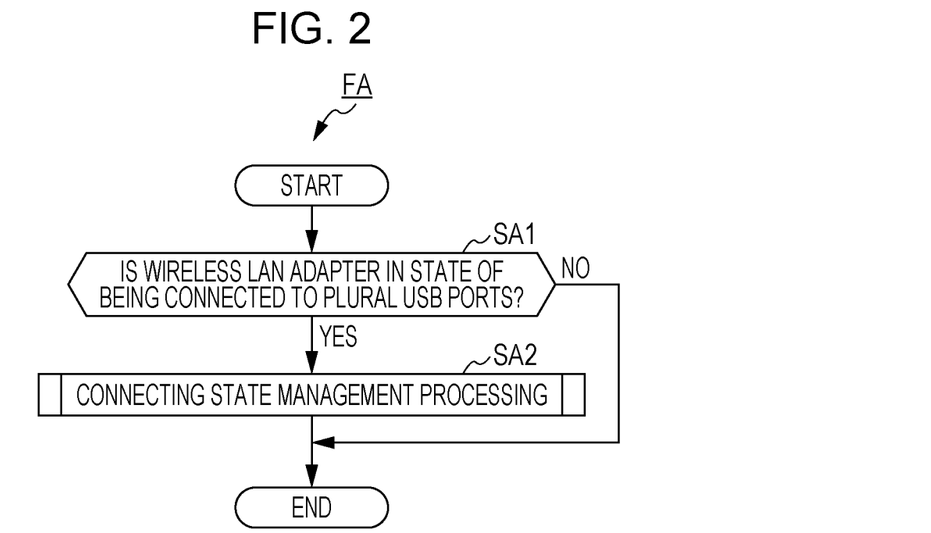
FIG. 2 is a flowchart illustrating operation of a print apparatus.

A flowchart FA of FIG. 2 is a flowchart illustrating the processing executed by the print apparatus 10 when the power of the print apparatus 10 is turned on and the print apparatus 10 is started. In other words, at the time of start, the print apparatus 10 executes the processing illustrated in the flowchart FA.

The print apparatus 10 executes the processing indicated by the flowchart FA, for example, in the initial processing performed at the time of start of the print apparatus 10.

As illustrated in FIG. 2, the control unit 20 of the print apparatus 10 determines whether or not the wireless LAN adapter AD is connected to the plurality of USB ports PT (step SA1).

In step SA1, the control unit 20 determines whether or not the wireless LAN adapter AD is in a state being connected to the plurality of USB ports PT, for example, by the following method. For example, the control unit 20 communicates with each of the USB devices connected to the USB port PT according to an USB and detects (acquires) a vendor ID and a product ID from each USB device. As well known, the vendor ID and the product ID are codes allocated to the USB device, and an USB host (print apparatus 10 in the present embodiment) can determine the type of the USB device by the combination of these IDs. The control unit 20 determines the type of each USB device based on the vendor ID and the product ID acquired from each USB device connected to the USB port PT. In a case where the control unit 20 detects an USB device whose type is the wireless LAN adapter AD and detects a plurality of vendor IDs or product IDs, the control unit 20 determines a case where the wireless LAN adapter AD is connected to the plurality of USB ports PT.

In step SA1, the method of determining whether or not the wireless LAN adapter AD is in a state of being connected to the plurality of USB ports PT is not limited to the illustrated method, and any method may be used.

In a case where the wireless LAN adapter AD is not connected to the plurality of USB ports PT (step SA1: NO), that is, in a case where the wireless LAN adapter AD is connected to one USB port PT, or in a case where all the wireless LAN adapters AD are not connected to the print apparatus 10, the control unit 20 ends the processing.

In a case where the wireless LAN adapter AD is in a state of being connected to the plurality of USB ports PT (step SA1: YES), the control unit 20 executes connecting state management processing (step SA2) and ends the processing.

Figure 3:
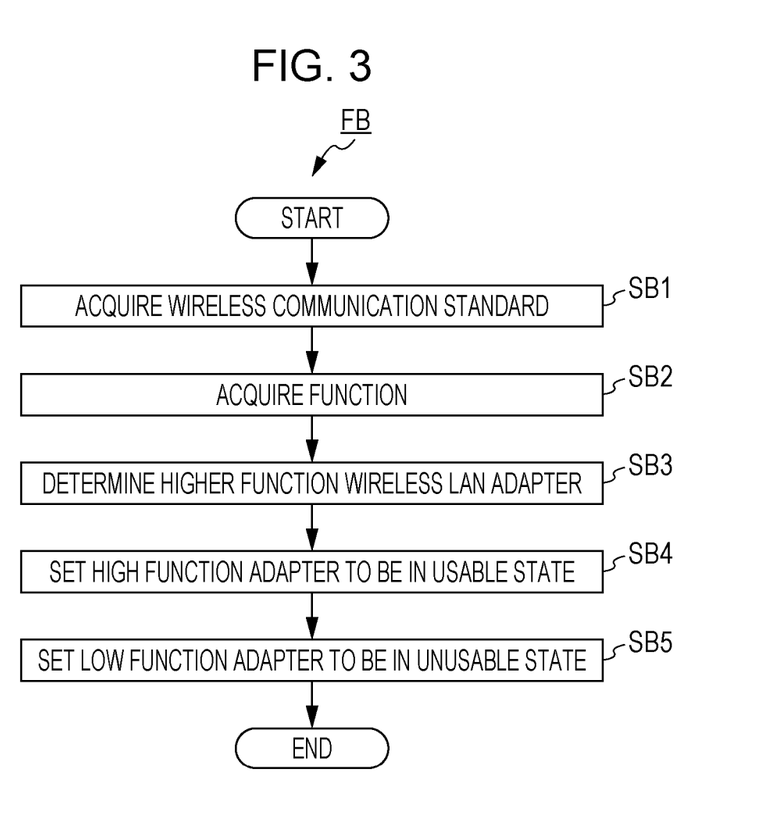
FIG. 3 is a flowchart illustrating the operation of the print apparatus.

The flowchart FB of FIG. 3 is a flowchart illustrating the details of the connecting state management processing.

As illustrated in the flowchart FB of FIG. 3, in the connecting state management processing, the control unit 20 communicates with each of the plurality of connected wireless LAN adapters AD, and the wireless communication standard (information related to wireless communication function, frequency band, electric wave reaching distance, electric wave intensity, or the like) corresponding to the wireless LAN adapters AD is acquired with respect to each of the wireless LAN adapters AD (step SB1).

As examples of the wireless communication standards, there are IEEE802.11b, IEEE802.11g, and IEEE802.11a, for example. Hereinafter, IEEE802.11b and IEEE802.11g are expressed collectively as "IEEE802.11b/g".

IEEE 802.11b/g is a communication standard which can use the "2.4 GHz" band as a frequency band, and IEEE 802.11a is a communication standard which can use the "5 GHz" band as a frequency band.

Next, the control unit 20 acquires function of each of the wireless LAN adapters AD based on the wireless communication standard of each of the plurality of connected wireless LAN adapters AD (step SB2).

In the present embodiment, the function of the wireless LAN adapter AD includes at least "frequency band corresponding to wireless LAN adapter AD".

In step SB2, in a case where the wireless communication standard of the wireless LAN adapter AD is IEEE802.11b/g, the control unit 20 acquires "2.4 GHz" band which is a frequency band corresponding to the wireless LAN adapter AD, as a function of the wireless LAN adapter AD.

In addition, in a case where the wireless communication standard of the wireless LAN adapter AD is IEEE802.11b/g and IEEE802.11a, the control unit 20 acquires "2.4 GHz" band and "5 GHz" band which are frequency bands corresponding to the wireless LAN adapter AD, as a function of the wireless LAN adapter AD.

Next, the control unit 20 determines a higher function wireless LAN adapter AD (step SB3) by comparison of the functions of the wireless LAN adapters AD acquired in step SB2 with respect to the plurality of connected wireless LAN adapters AD with each other. Hereinafter, processing of step SB3 will be described in detail.

In step SB3, the control unit 20 determines the wireless LAN adapter AD having the larger number of corresponding frequency bands as the higher function wireless LAN adapter AD. For example, it is assumed that the frequency band corresponding to one wireless LAN adapter AD is "2.4 GHz" band and the frequency bands corresponding to the other wireless LAN adapters AD are "2.4 GHz" band and "5 GHz" band. In this case, the control unit 20 determines the other wireless LAN adapters AD as the higher function wireless LAN adapter AD.

The reason why the control unit 20 determines the wireless LAN adapter AD having the larger number of corresponding frequency bands as the higher function wireless LAN adapter AD is as follows.

In other words, in the present embodiment, in a case where there are a plurality of frequency bands corresponding to the wireless LAN adapter AD connected to the print apparatus 10, the user can select the frequency band to be used by predetermined means. The fact that the number of corresponding frequency bands is large for the wireless LAN adapter AD means that there are many candidates for frequency bands that the user can select. The user can select a suitable frequency band based on the environment of the place where the print apparatus 10 is installed and the characteristics related to communication required for the print apparatus 10, as the number of frequency band candidates selectable by the user increases. Based on the above, the control unit 20 determines the wireless LAN adapter AD having the larger number of corresponding frequency bands as the higher function wireless LAN adapter AD.

In a case where the number of corresponding frequency bands is the same for each of the plurality of wireless LAN adapters AD, the control unit 20 determines the higher function wireless LAN adapter AD by reflecting the electric wave reaching distance and the electric wave intensity of each wireless LAN adapter AD. Specifically, the electric wave reaching distance and the electric wave intensity are different for each type of wireless LAN adapters AD. Based on this, a table corresponding to information indicating the model, information indicating the electric reaching distance of the wireless LAN adapter AD, and information indicating electric wave intensity of the wireless LAN adapter AD is stored in the storage unit 22 of the print apparatus 10 in advance for each model of the wireless LAN adapter AD. The electric wave reaching distance and the electric wave intensity for each model may use those that the manufacturer of the wireless LAN adapter AD publishes as the specification of the product, or may be based on the result of tests or simulations. The control unit 20 determines the model of the wireless LAN adapter AD based on the vendor ID and the product ID of the wireless LAN adapter AD for each of the plurality of connected wireless LAN adapters AD. Next, the control unit 20 acquires the electric wave reaching distance and the electric wave intensity for each of the plurality of connected wireless LAN adapters AD based on the table described above. Next, the control unit 20 compares the electric wave reaching distance and electric wave intensity of each of the plurality of connected wireless LAN adapters AD, and determines a higher function wireless LAN adapter AD. The control unit 20 may be configured to determine a higher function wireless LAN adapter AD based on either one of the electric wave reaching distance and the electric wave intensity, but not both.

The method of determining the higher function wireless LAN adapter AD among the plurality of connected wireless LAN adapters AD is not limited to the method described above. For example, the control unit 20 may be configured to use the electric wave reaching distance or the electric wave intensity to determine a higher-function wireless LAN adapter AD without using the corresponding number of frequency bands. In other words, any method may be used as long as the wireless LAN adapter AD having high communication stability, high communication efficiency, and the like is determined as a higher function wireless LAN adapter AD.

In the following description, in step SB3, the control unit 20 expresses the higher function wireless LAN adapter AD as "high function adapter" and the wireless LAN adapter AD other than the high function adapter as "low-function adapter" among the connected wireless LAN adapters AD.

After the high function adapter is determined in step SB3, the control unit 20 sets the high function adapter to be in a usable state (step SB4). Specifically, the control unit 20 loads a device driver for controlling the high function adapter. In a case where the device driver is configured to be automatically loaded at the time of start of the print apparatus 10, the control unit 20 maintains a state where the device driver for controlling the high function adapter is loaded. The control unit 20 operates the high function adapter by the function of the loaded device driver. The operation of the high function adapter means a state where the high function adapter can be controlled by the control unit 20 and the print apparatus 10 is in a state of being capable of communicating with an external apparatus via the high function adapter.

Next, the control unit 20 sets the low function adapter to be in an unusable state (step SB5). Specifically, the control unit 20 unloads a device driver for controlling the low function adapter. In a case where the device driver is not automatically loaded at the time of start of the print apparatus 10, the control unit 20 maintains a state where the device driver for controlling the low function adapter is unloaded. The control unit 20 stops the allocation of resource to the low function adapter by unloading the device driver for controlling the low function adapter. The allocation of resource to the low function adapter means that a storage area is secured to the RAM and other memories or that a process generated by the device driver is allocated to the CPU, with respect to the device driver for controlling the low function adapter. In addition, the supply of power to the low function adapter is stopped and the low function adapter is set in a state of being not operated by the device driver for controlling the low function adapter being unloaded.

As described above, in the present embodiment, at the time of start of the print apparatus 10, in a case where the wireless LAN adapters are in a state of being connected to the plurality of USB ports PT, only the high function adapter is set to be in a usable state and the low function adapter other than the high function adapter is set to be in an unusable state by the connecting state management processing being executed by the control unit 20. Accordingly, the following effects are obtained.

In a case where a plurality of wireless LAN adapters AD are connected to the print apparatus 10 and each of the plurality of wireless LAN adapters AD is set to be in a usable state to transmit and receive electric waves, there are the following problems. In other words, electric waves transmitted and received by the plurality of wireless LAN adapters AD causes electric wave interference, and thus there is a possibility that the communication with the external apparatus via the wireless LAN adapter AD may be adversely affected. In addition, transmission and reception of unnecessary electric waves (for example, transmission of electric waves superimposed with a response request signal periodically performed to detect an communicable external apparatus) are performed by any of the plurality of wireless LAN adapters AD and there is a possibility of using the electric wave band unnecessarily. On the other hand, in the present embodiment, in a case where several wireless LAN adapters AD are connected to the print apparatus 10, since one wireless LAN adapter AD is set to be in a usable state, occurring of the problem described above can be prevented.

Particularly, in this embodiment, since a higher function wireless LAN adapter AD can be set to be in a usable state among the plurality of wireless LAN adapters AD, the print apparatus 10 can communicate with an external apparatus via a higher function wireless LAN adapter AD.

Further, since the allocation of resource to the low function adapters is stopped, among the plurality of connected wireless LAN adapters AD, unnecessary consumption of resource can be prevented. In addition, the processing load of the CPU and the consumption of memory can be suppressed.

Further, since the supply of electric power to the low function adapter is stopped among the plurality of connected wireless LAN adapters AD, unnecessary consumption of electric power can be prevented and power saving can be realized.

Next, when one wireless LAN adapter AD is connected in a usable state while being started, the operation of the print apparatus 10 will be described.

The print apparatus 10 has a mode M1 and a mode M2 as operation modes. Hereinafter, when the operation mode is the mode M1, the operation of the print apparatus 10 will be described, and then when the operation mode is the mode M2, the operation of the print apparatus 10 will be described. The operation mode can be switched by the user by a predetermined means.

Figure 4:
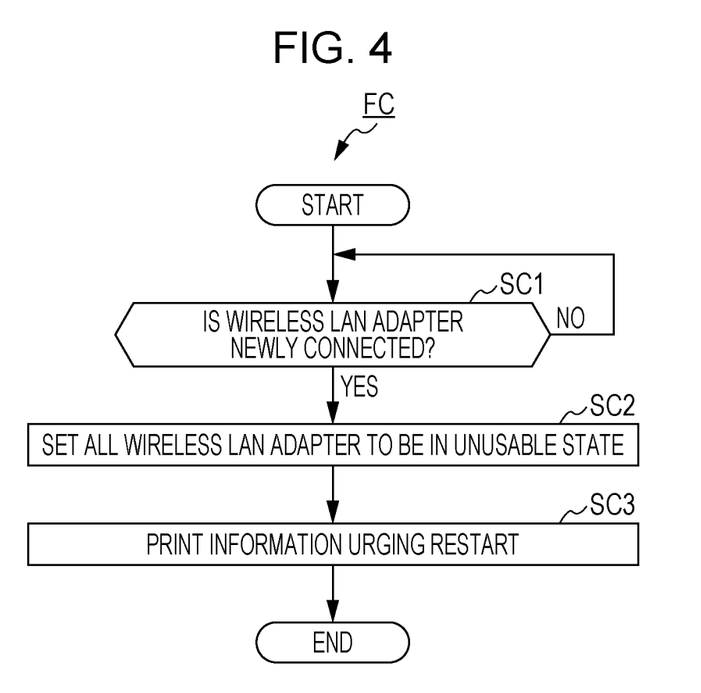
FIG. 4 is a flowchart illustrating the operation of the print apparatus.

The flowchart FC of FIG. 4 is a flowchart illustrating the operation of the print apparatus 10 when the operation mode is the mode M1.

At the time of start of the flowchart FC of FIG. 4, one wireless LAN adapter AD is connected to the print apparatus 10 and the wireless LAN adapter AD is in a usable state.

As illustrated in FIG. 4, in the mode M1, the control unit 20 of the print apparatus 10 monitors whether or not the wireless LAN adapter AD is newly connected to any of the USB ports PT (step SC1). In a case where the wireless LAN adapter AD is newly connected, the plurality of wireless LAN adapters AD are set to be in a state of being connected to the print apparatus 10.

In a case where it is detected that the wireless LAN adapter AD is newly connected (step SC1: YES), the control unit 20 set both the wireless LAN adapter AD which is in a state of being already connected and the wireless LAN adapter AD which is newly connected to be in an unusable state (step SC2). As described above, the control unit 20 set the wireless LAN adapter AD to be in an unusable state by unloading the device driver. By the processing of step SC2, the print apparatus 10 is set to be in a state of being incapable of communicating with an external apparatus via the wireless LAN adapter AD.

Figure 5:
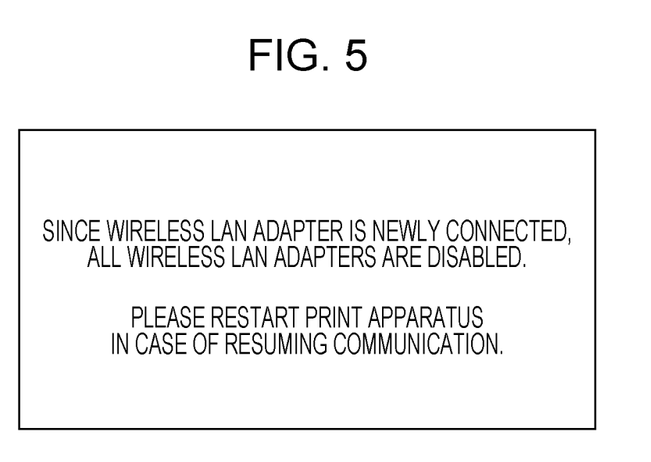
FIG. 5 is a diagram illustrating an example of information which is printed on a print medium.

Next, the control unit 20 controls the print unit 21 to print information at least including information that all the wireless LAN adapters AD are set to be in an unusable state since the plurality of wireless LAN adapters AD are connected and information for urging restart on the print medium. (step SC3). FIG. 5 illustrates an example of information printed on the print medium in step SC3.

By confirming the information printed on the print medium by visual recognition, the user can quickly recognize that the print apparatus is in a state of being incapable of communicating with an external apparatus via the wireless LAN adapter AD and that restart should be executed. In addition, the user can execute the restart of the print apparatus 10 based on the recognition.

As described above, in a case where the print apparatus 10 is restarted, the connecting state management processing is executed by the print apparatus 10 according to the restart, the high function adapter can be used and the low function adapter is set to be in an unusable state.

According to the mode M1 described above, in a case where the wireless LAN adapter AD is newly connected to the print apparatus 10 while the print apparatus 10 is started, the print apparatus 10 can be smoothly shifted to a state of being capable of communicating with an external apparatus via the wireless LAN adapter AD by suitable using that the connecting state management processing is executed at the time of start, after a problem which can be generated when the plurality of wireless LAN adapters AD are connected to the print apparatus 10 in a usable state is reliably prevented.

Figure 6:
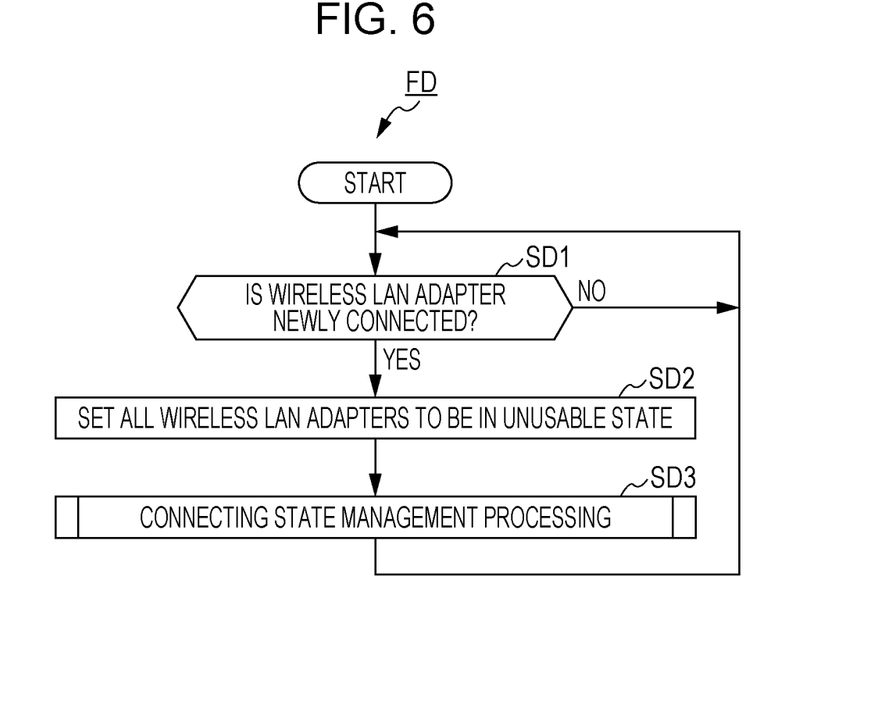
FIG. 6 is a flowchart illustrating the operation of the print apparatus.

The flowchart FD of FIG. 6 is a flowchart illustrating the operation of the print apparatus 10 when the operation mode is the mode M2.

At the starting point of the flowchart FD of FIG. 6, one wireless LAN adapter AD is connected to the print apparatus 10, and the wireless LAN adapter AD can be set in a usable state.

As illustrated in FIG. 6, in the mode M2, the control unit 20 of the print apparatus 10 monitors whether or not the wireless LAN adapter AD is newly connected to any of the USB ports PT (step SD1). In a case where the wireless LAN adapter AD is newly connected, the plurality of wireless LAN adapters AD is set to be in a state of being connected to the print apparatus 10.

In a case where it is detected that the wireless LAN adapter AD is in a state of being newly connected (step SD1: YES), the control unit 20 temporarily set both the wireless LAN adapter AD which is in a state of being already connected and the wireless LAN adapter AD which is newly connected to be in an unusable state (step SD2).

Next, the control unit 20 executes the connecting state management processing (step SD3).

As described above, the high function adapter is set to be in a usable state and the low function adapter is set to be in an unusable state, by the connecting state management processing being executed.

According to the mode M2 described above, in a case where the wireless LAN adapter AD is newly connected to the print apparatus 10 while the print apparatus 10 is started, the print apparatus 10 can be smoothly shifted to a state of being capable of automatically communicating with an external apparatus via the wireless LAN adapter AD without involving work of the user, after a problem which can be generated when the plurality of wireless LAN adapters AD are connected to the print apparatus 10 in a usable state is reliably prevented.

As described above, the print apparatus 10 according to the present embodiment includes a print unit which prints on a print medium; a plurality of USB ports PT (connection units, connectors) which can connect the wireless LAN adapter AD (wireless communication adapter); and a control unit 20 which acquires function of the wireless LAN adapter AD from the plurality of connected wireless LAN adapters AD in a case where the wireless LAN adapters AD are in a state of being connected to the plurality of USB ports PT and executes the connecting state management processing which sets one higher function wireless LAN adapter to be in a usable state and sets the other wireless LAN adapters to be in an unusable state by comparison of the acquired functions of the plurality of wireless LAN adapters AD.

According to the configuration, in a case where the plurality of wireless LAN adapters AD are connected to the print apparatus 10, the print apparatus 10 can be shifted to a state of being capable of communicating with an external apparatus via a high function wireless LAN adapter AD suitable for use in communication, after a problem which can be generated due to the fact that the plurality of wireless LAN adapters AD are connected in a usable state is prevented. In other words, according to the configuration described above, the print apparatus 10 can execute processing corresponding to the possibility that the plurality of wireless LAN adapters AD are connected.

In addition, in the present embodiment, the control unit 20 stops the supply of electric power to the wireless LAN adapter AD in a case where the wireless LAN adapter AD is set to be in an unusable state.

According to the configuration, unnecessary power consumption can be suppressed and power saving can be realized.

In addition, in the present embodiment, in a case where the wireless LAN adapter AD is set to be in an unusable state, the control unit 20 stops the allocation of the resource to the wireless LAN adapter AD.

According to the configuration, consumption of unnecessary resource can be suppressed.

In addition, in the present embodiment, the control unit 20 executes the connecting state management processing at the time of start.

According to the configuration, in a case where the print apparatus 10 is started in a state where the plurality of wireless LAN adapters AD connected, the print apparatus 10 can prevent a problem generated due to the fact that the plurality of wireless LAN adapters AD are connected, at the time of start.

In addition, in the present embodiment, in a case where the wireless LAN adapter AD is in a state of being connected to the plurality of USB ports PT, when the wireless LAN adapter AD is connected to one USB port PT and the wireless LAN adapter AD is connected to the other USB port PT, the control unit 20 sets all the wireless LAN adapters AD to be in an unusable state and causes to print information for urging restart on the print unit 21.

According to the configuration, in a case where the wireless LAN adapter AD is newly connected to the print apparatus 10 while the print apparatus 10 is started, in a case where a new wireless LAN adapter AD is connected to the print apparatus while the print apparatus is started, the print apparatus can be smoothly shifted to a state of being capable of communicating with an external apparatus via the wireless LAN adapter AD by suitable using that the connecting state management processing is executed at the time of start (restart), after a problem which can be generated when the plurality of wireless LAN adapters AD are connected to the print apparatus 10 in a usable state is reliably prevented.

In addition, in the present embodiment, in a case where the wireless LAN adapter AD is in a state of being connected to the plurality of USB ports PT, when the wireless LAN adapter AD is in a state of being connected to one USB port PT and the wireless LAN adapter AD is connected to the other USB port PT, the control unit 20 executes the connecting state management processing.

According to the configuration, in a case where the wireless LAN adapter AD is newly connected to the print apparatus 10 while the print apparatus 10 is started, the print apparatus 10 can be automatically shifted to a state of being capable of automatically communicating with an external apparatus via the wireless LAN adapter AD without involving work of the user, after a problem which can be generated when the plurality of wireless LAN adapters AD are connected to the print apparatus 10 in a usable state is reliably prevented.

In addition, in the present embodiment, in the connecting state management processing, the control unit 20 determines the wireless LAN adapter AD having a large number of corresponding frequency bands as a high function wireless LAN adapter AD among the plurality of connected wireless LAN adapters AD.

According to the configuration, as the print apparatus has a large number of corresponding frequency bands, has a large number of frequency bands which is selectable by the user, and has a high possibility of being capable of setting to the frequency according to environment in which the print apparatus 10 is installed, the print apparatus 10 can be preferentially as a wireless LAN adapter AD actually used for communication.

In addition, in the present embodiment, in the connecting state management processing, when identifying the high function wireless LAN adapter AD among the plurality of connected wireless LAN adapters AD, the control unit 20 determines by reflecting the electric wave reaching distance or the electric field intensity of the wireless LAN adapter AD.

According to the configuration, the control unit 20 can suitably determine the high function wireless LAN adapter AD by reflecting the electric wave reaching distance or the electric wave intensity.

The embodiment described above merely describes one aspect of the invention, and can be arbitrarily modified and applied within the scope of the invention.

For example, in the embodiment described above, the wireless LAN adapter AD is an USB device and communicates with the print apparatus 10 according to USB specifications. However, the communication protocol used for communication between the wireless LAN adapter AD and the print apparatus 10 may be not limited to the USB.

In addition, for example, in a case where the method for controlling a print apparatus 10 described above (method for controlling print apparatus) is realized by using a computer included in the print apparatus 10 or an external apparatus connected to the print apparatus 10, the invention can be also configured by an aspect of a program executed by a computer to realize the method, a recording medium in which the program is recorded so as to be readable by a computer, or a transmission medium for transmitting the program. As the recording medium, a magnetic or optical recording medium or a semiconductor memory device can be used. Specifically, the recording medium is a portable type recording medium such as a flexible disk, a Hard Disk Drive (HDD), a Compact Disk Read Only Memory (CD-ROM), a Digital Versatile Disk (DVD), a Blu-ray (registered trademark) Disc, a magneto-optical disk, a flash memory, and a card Type recording medium, or a fixed type recording medium, as an example. In addition, the recording medium may be a nonvolatile storage device such as a Random Access Memory (RAM), a Read Only Memory (ROM), and an HDD which is an internal storage device included in the print apparatus 10 or an external apparatus connected to the print apparatus 10.

In addition, each functional block described with reference to the drawings can be arbitrarily realized by hardware and software, and does not suggest a specific hardware configuration.

What is claimed is:

1. A print apparatus configured to be able to connect a first wireless communication adapter and a second wireless communication adapter, the apparatus comprising:
    a print mechanism including a printhead and configured to print on a print medium by the printhead;
    a first connector to which the first wireless communication adapter is connectable;
    a second connector to which the second wireless communication adapter is connectable;
    a memory; and
    a processor configured to:
        detect that the first wireless communication adapter is in a state of being connected to the first connector and that the second wireless communication adapter is in a state of being connected to the second connector;
        in response to the detection,
            acquire first information related to a wireless communication function of the first wireless communication adapter connected to the first connector and second information related to a wireless communication function of the second wireless communication adapter connected to the second connector;
            execute processing which sets the first wireless communication adapter to be in a usable state and sets the second wireless communication adapter to be in an unusable state based on a result of comparison of the acquired first information and the acquired second information; and
            stop allocation of at least one of an area of the memory or a process executed by the processor to the second wireless communication adapter in a case where the second wireless communication adapter is set to be in an unusable state,
    wherein the processor is further configured to execute the processing at the time of start,
    the processor is further configured, when the processor detects that the first wireless communication adapter is in state of being connected to the first connector and the second wireless communication adapter is also connected to the second connector, to set the first and second wireless communication adapters to be in an unusable state and to print information for urging restart on the print mechanism.

2. The print apparatus according to claim 1,
    wherein the processor is further configured to stop power supply to the second wireless communication adapter in a case where the second wireless communication adapter is set to be in an unusable state.

3. The print apparatus according to claim 1,
    wherein the first information relates to a frequency band corresponding to the first wireless communication adapter and the second information relates to a frequency band corresponding to the second wireless communication adapter, and
    the processor is further configured to determine a wireless communication adapter having a largest number of corresponding frequency bands as the wireless communication adapter to use among the first and second wireless communication adapters, in the processing.

4. The print apparatus according to claim 1,
    wherein the first information relates to an electric wave reaching distance or an electric wave intensity of the first wireless communication adapter and the second information relates to an electric wave reaching distance or an electric wave intensity of the second wireless communication adapter, and
    the processor is further configured to perform determination based on the electric wave reaching distance or the electric wave intensity of the wireless communication adapter when determining the wireless communication adapter to use among the first and second wireless communication adapters, in the processing.

5. A method for controlling a print apparatus configured to include a print mechanism that includes a printhead and is configured to print on a print medium by the printhead; and a first connector to which a first wireless communication adapter and a second connector to which a second wireless communication adapter is connectable, the method including:
  detecting that the first wireless communication adapter is in a state of being connected to the first connector and that the second wireless communication adapter is in a state of being connected to the second connector;
  in response to the detection,
    acquiring first information relating to a wireless communication function of the first wireless communication adapter connected to the first connector and second information relating to the second wireless communication function of the second wireless communication adapter connected to the second connector;
    executing processing which sets the first wireless communication adapter to be in a usable state and the second wireless communication adapter to be in an unusable state based on a result of comparison of the acquired first information and the acquired second information;
    stopping allocation of at least one of an area of a memory or a process executed by a processor to the second wireless communication adapter in a case where the second wireless communication adapter is set to be in an unusable state; and
    executing the processing at the time of start; and
  when the processor detects that the first wireless communication adapter is in a state of being connected to the first connector and the second wireless communication adapter is also connected to the second connector,
    setting the first and second wireless communication adapters to be in an unusable state, and
    printing information for urging restart on the print mechanism.

6. The method for controlling a print apparatus according to claim 5, further comprising:
  stopping power supply to the second wireless communication adapter in a case where the second wireless communication adapter is set to be in an unusable state.

7. The method for controlling a print apparatus according to claim 5,
  wherein the first information relates to a frequency band corresponding to the first wireless communication adapter and the second information relates to a frequency band corresponding to the second wireless communication adapter, and
  the method further comprises determining a wireless communication adapter having a largest number of corresponding frequency bands as the wireless communication adapter to use among the first and second communication adapters, in the processing.

8. The method for controlling a print apparatus according to claim 5,
  wherein the first information relates to an electric wave reaching distance or an electric wave intensity of the first wireless communication adapter and the second information relates to an electric wave reaching distance or an electric wave intensity of the second wireless communication adapter, and
  the method further comprises performing determination of the wireless communication adapter to use based on the electric wave reaching distance or the electric wave intensity of the wireless communication adapter when the wireless communication adapter to use is determined among the first and second wireless communication adapters, in the processing.

9. A print apparatus configured to be able to connect a first wireless communication adapter and a second wireless communication adapter, the apparatus comprising:
  a print mechanism including a printhead and configured to print on a print medium by the printhead;
  a first connector to which the first wireless communication adapter is connectable;
  a second connector to which the second wireless communication adapter is connectable;
  a memory; and
  a processor configured to:
    detect that the first wireless communication adapter is in a state of being connected to the first connector and that the second wireless communication adapter is in a state of being connected to the second connector;
    in response to the detection,
      acquire first information related to a wireless communication function of the first wireless communication adapter connected to the first connector and second information related to a wireless communication function of the first wireless communication adapter connected to the second connector;
      execute processing which sets the first wireless communication adapter to be in a usable state and sets the second wireless communication adapter to be in an unusable state based on a result of comparison of the acquired first information and the acquired second information; and
      stop allocation of at least one of an area of the memory or a process executed by the processor to the second wireless communication adapter in a case where the second wireless communication adapter is set to be in an unusable state,
  wherein the processor is further configured to execute the processing when the processor detects that the first wireless communication adapter is in a state of being connected to the first connector and the second wireless communication adapter is also connected to the second connector.

10. A method for controlling a print apparatus configured to include
  a print mechanism that includes a printhead and is configured to print on a print medium by the printhead; and
  a first connector to which a first wireless communication adapter and a second connector to which a second wireless communication adapter are connectable,
  the method comprising:
  detecting that the first wireless communication adapter is in a state of being connected to the first connector and that the second wireless communication adapter is in a state of being connected to the second connector;
  in response to the detection,
    acquiring first information relating to a first wireless communication function of the first wireless communication adapter connected to the first connector and second information relating to a second wireless communication function of the second wireless communication adapter connected to the second connector, and
    executing processing which sets the first wireless communication adapter to be in a usable state and the second wireless communication adapter to be in an unusable state based on a result of comparison of the acquired first information and the acquired second information; and stopping allocation of at least one of an area of a memory or a process executed by a processor to the second wireless communication adapter in a case where the second wireless communication adapter is set to be in an unusable state; and executing the processing when the processor detects that the first wireless communication adapter is in a state of being connected to the first connector and the second wireless communication adapter is also connected to the second connector.

* * * * *